(12) United States Patent
    Tränk et al.

(10) Patent No.: US 11,477,798 B2
(45) Date of Patent: Oct. 18, 2022

(54) PRIORITY OF NETWORK RESOURCES IN A NETWORK

(71) Applicant: Telefonaktiebolaget LM Ericsson (publ), Stockholm (SE)

(72) Inventors: Magnus Tränk, Lerum (SE); Mikael Persson, Nödinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 16/608,891

(22) PCT Filed: May 31, 2018

(86) PCT No.: PCT/EP2018/064354
    § 371 (c)(1),
    (2) Date: Oct. 28, 2019

(87) PCT Pub. No.: WO2018/220122
    PCT Pub. Date: Dec. 6, 2018

(65) Prior Publication Data
    US 2020/0367262 A1    Nov. 19, 2020

Related U.S. Application Data

(60) Provisional application No. 62/513,621, filed on Jun. 1, 2017.

(51) Int. Cl.
    *H04W 4/00*     (2018.01)
    *H04W 72/10*    (2009.01)
    (Continued)

(52) U.S. Cl.
    CPC .......... *H04W 72/10* (2013.01); *H04L 47/805* (2013.01); *H04W 4/08* (2013.01); *H04W 4/10* (2013.01); *H04W 4/90* (2018.02); *H04W 76/50* (2018.02)

(58) Field of Classification Search
    CPC . H04W 72/04; H04W 72/0426; H04W 72/10; H04W 72/0433
    See application file for complete search history.

(56) References Cited

U.S. PATENT DOCUMENTS 9,420,602 B2 *  8/2016  Buyukkoc ......... H04W 72/1247
11,128,991 B2   9/2021  Yang et al.
(Continued)

FOREIGN PATENT DOCUMENTS

CN      101540980 A    9/2009
CN      106537950 A    3/2017

OTHER PUBLICATIONS

3rd Generation Partnership Project, "3rd Generation Partnership Project; Technical Specification Group Services and System Aspects; Common Functional Architecture to Support Mission Critical Services; Stage 2 (Release 14)", Technical Specification, 3GPP TS 23.280 V14.1.0, Mar. 1, 2017, pp. 1-141, 3GPP.

(Continued)

*Primary Examiner* — Omoniyi Obayanju
(74) *Attorney, Agent, or Firm* — Coats & Bennett, PLLC

(57) ABSTRACT

There is provided mechanisms for determining priority of use of network resources used by an MC service in a network. A method is performed by a first MC service server. The method comprises obtaining a priority request from a second MC service server for elevated priority of use of network 5 resources for a service provided by the second MC service server. The method comprises determining whether to grant, reject, or queue the priority request. The method comprises, when determined to grant the priority request, providing a first notification of the grant to the second MC service server and a second notification of the grant to at least one third MC service server.

19 Claims, 5 Drawing Sheets

(51) Int. Cl.
*H04W 4/90* (2018.01)
*H04W 76/50* (2018.01)
*H04L 47/80* (2022.01)
*H04W 4/08* (2009.01)
*H04W 4/10* (2009.01)

(56) References Cited

U.S. PATENT DOCUMENTS

| | | | |
|---|---|---|---|
| 2002/0041585 A1* | 4/2002 | Bahl | H04W 72/0446 370/337 |
| 2010/0202391 A1* | 8/2010 | Palanki | H04W 72/0426 370/329 |
| 2010/0332610 A1 | 12/2010 | Cherian et al. | |
| 2012/0042059 A1 | 2/2012 | Tian et al. | |
| 2015/0305004 A1* | 10/2015 | Ohta | H04W 72/0486 370/330 |
| 2018/0084429 A1* | 3/2018 | Guo | H04W 72/0406 |

OTHER PUBLICATIONS

3rd Generation Partnership Project, "3rd Generation Partnership Project; Technical Specification Group Services and System Aspects; Study on Migration and Interconnection for Mission Critical Services (Release 15)", Technical Report, 3GPP TR 23.781 V2.0.0, May 1, 2017, pp. 1-66, 3GPP.

3rd Generation Partnership Project, "3rd Generation Partnership Project; Technical Specification Group Services and System Aspects; Functional Architecture and Information Flows to Support Mission Critical Push to Talk (MCPTT); Stage 2 (Release 14)", Technical Specification, 3GPP TS 23.379 V14.1.0, Mar. 1, 2017, pp. 1-186, 3GPP.

3rd Generation Partnership Project, "3rd Generation Partnership Project; Technical Specification Group Services and System Aspects; Study on Mission Critical Communication Interworking Between LTE and Non-LTE Systems (Release 15)", Technical Specification, 3GPP TR 23.782 V0.6.1, May 1, 2017, pp. 1-101, 3GPP.

\* cited by examiner

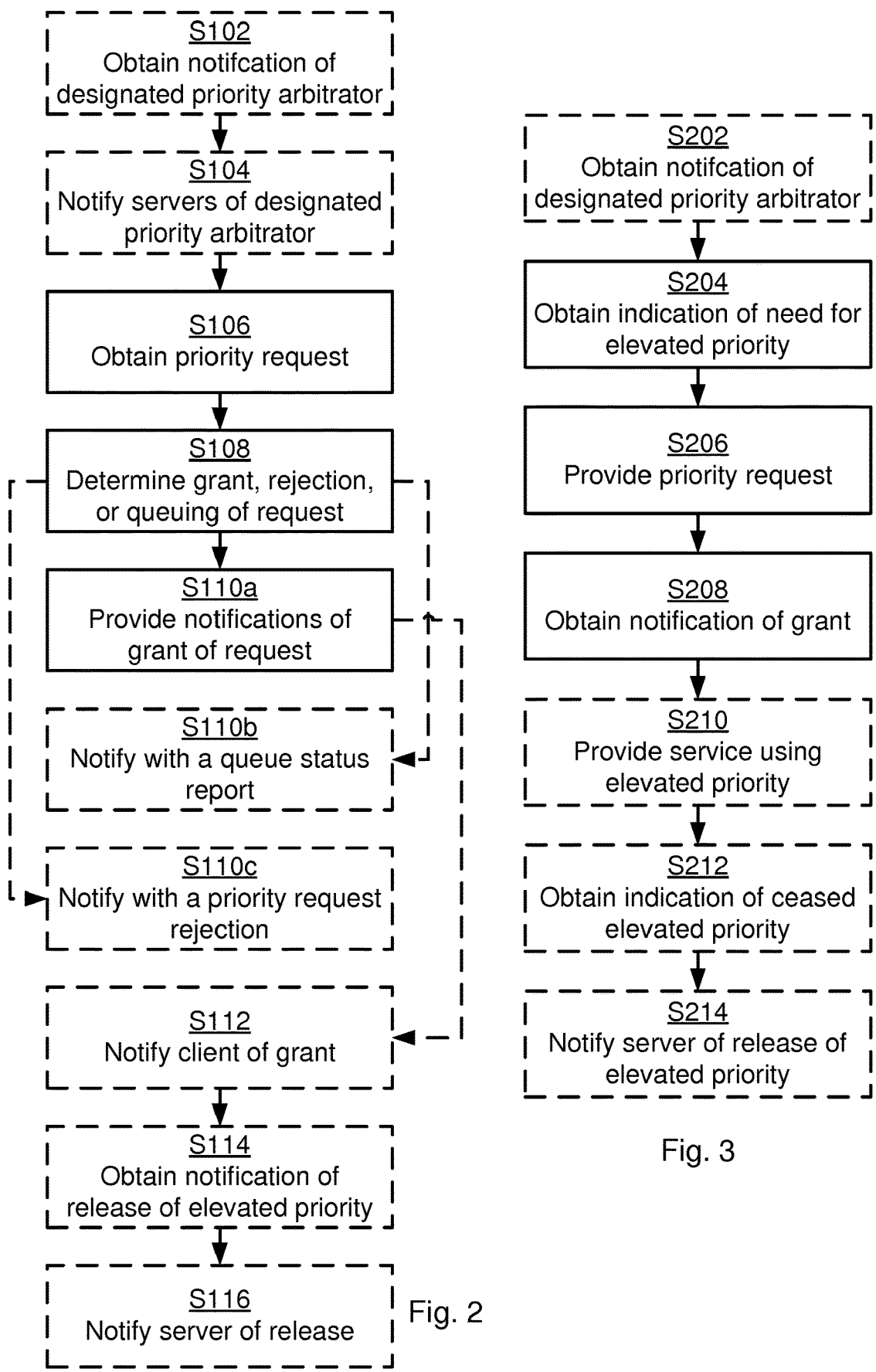

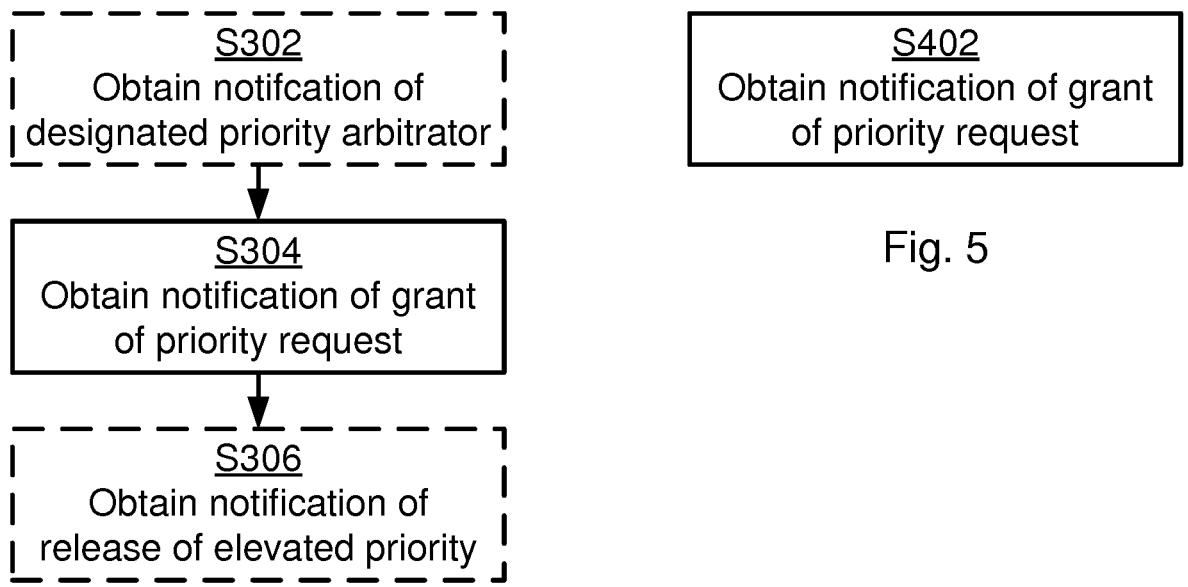
Fig. 4
Fig. 5
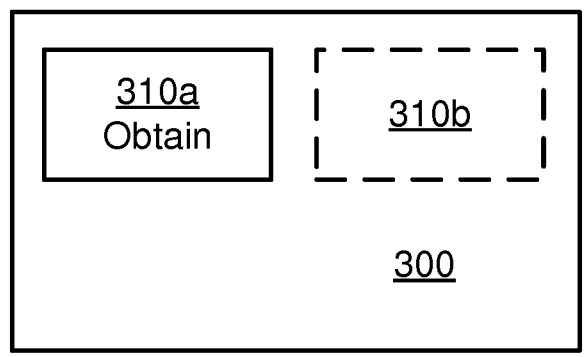
Fig. 10

PRIORITY OF NETWORK RESOURCES IN A NETWORK

TECHNICAL FIELD

Embodiments presented herein relate to methods, Mission Critical (MC) service servers, computer programs, and a computer program product for determining priority of use of network resources used by an MC service in a network and priority notification of an MC service in a network. Further embodiments presented herein relate to a method, an MC client node, a computer program, and a computer program product for priority notification of an MC service in a network.

BACKGROUND

In communications networks, there may be a challenge to obtain good performance and capacity for a given communications protocol, its parameters and the physical environment in which the communications network is deployed.

For example, so-called Mission Critical (MC) communication services (hereinafter MC service for short) could be essential for the work performed by public safety users, e.g. ambulance services, police force and fire brigade. MC services require preferential handling compared to normal telecommunication services, including prioritized handling of MC calls for emergency and imminent threats. One commonly used communication mechanism for public safety users is Group Communication (GC). Group Communication generally requires that the same information is delivered to multiple users. One type of Group Communication is Push to Talk (PTT) services.

A PTT call typical starts with that one user requests the right to transmit and a PIT control node grants this request. The media of the call (such as audio, video, text, images, etc.) is then transmitted from one user to multiple PIT users. These PTT users may be located at different locations. If many users are located within the same area, multicast or broadcast based transmission using e.g. Multicast-Broadcast Multimedia Services (MBMS) in a third generation partnership project (3GPP) network enabled for MBMS is efficient.

MC services could require special quality of service (QoS) profiles, including the possibility to manage the priority for the service. There could be requirements to dynamically increase the priority for certain MC call types e.g. emergency call and imminent peril calls. There could be a need to dynamically adjust the priority based on other parameters. For example, increase the priority for users located in a certain incident area or increased priority for user with certain roles (e.g. Public Safety Dispatcher or supervisor).

With an increased group communication need and increased availability of different kind of MC communication services there is thus a need to manage priority treatment among different kind of services and service platforms.

SUMMARY

An object of embodiments herein is to provide efficient handling of priorities of MC services in a network.

According to a first aspect there is presented a method for determining priority of use of network resources used by an MC service in a network. The method is performed by a first MC service server and a second MC service server. The method comprises obtaining by the second MC service server (an indication of a need for elevated priority of use of network resources for a service provided by the second MC service server. The method comprises obtaining by the first MC service server a priority request from the second MC service server for elevated priority of use of network resources for the service provided by the second MC service server. The method comprises determining by the first MC service server whether to grant, reject, or queue the priority request; and when determined to grant the priority request. The method comprises obtaining by the second MC service server a first notification of the grant of the request from the first MC service server.

According to a second aspect there is presented a network for determining priority of use of network resources used by an MC service in a network. The network comprises a first MC service server and a second MC service server configured to perform the method according to the first aspect.

According to a third aspect there is presented a method for determining priority of use of network resources used by an MC service in a network. The method is performed by a first MC service server. The method comprises obtaining a priority request from a second MC service server for elevated priority of use of network resources for a service provided by the second MC service server. The method comprises determining whether to grant, reject, or queue the priority request. The method comprises, when determined to grant the priority request, providing a first notification of the grant to the second MC service server and a second notification of the grant to at least one third MC service server.

According to a fourth aspect there is presented an MC service server for determining priority of use of network resources used by an MC service in a network. The MC service server comprises processing circuitry. The processing circuitry is configured to cause the MC service server to obtain a priority request from a second MC service server for elevated priority of use of network resources for a service provided by the second MC service server. The processing circuitry is configured to cause the MC service server to determine whether to grant, reject, or queue the priority request. The processing circuitry is configured to cause the MC service server to, when determined to grant the priority request, provide a first notification of the grant to the second MC service server and a second notification of the grant to at least one third MC service server.

According to a fifth aspect there is presented an MC service server for determining priority of use of network resources used by an MC service in a network. The MC service server comprises processing circuitry and a storage medium. The storage medium stores instructions that, when executed by the processing circuitry, cause the MC service server to perform operations, or steps. The operations, or steps, cause the MC service server to obtain a priority request from a second MC service server for elevated priority of use of network resources for a service provided by the second MC service server. The operations, or steps, cause the MC service server to determine whether to grant, reject, or queue the priority request. The operations, or steps, cause the MC service server to, when determined to grant the priority request, provide a first notification of the grant to the second MC service server and a second notification of the grant to at least one third MC service server.

According to a sixth aspect there is presented an MC service server for determining priority of use of network resources used by an MC service in a network. The MC service server comprises an obtain module configured to obtain a priority request from a second MC service server for elevated priority of use of network resources for a service provided by the second MC service server. The MC service server comprises a determine module configured to determine whether to grant, reject, or queue the priority request. The MC service server comprises a provide module configured to, when determined to grant the priority request, provide a first notification of the grant to the second MC service server and a second notification of the grant to at least one third MC service server.

According to a seventh aspect there is presented a computer program for determining priority of use of network resources used by an MC service in a network. The computer program comprises computer program code which, when run on processing circuitry of an MC service server, causes the MC service server to perform a method according to the third aspect.

According to an eight aspect there is presented a method for priority notification of an MC service in a network. The method is performed by a second MC service server. The method comprises obtaining an indication of a need for elevated priority of use of network resources for a service provided by the MC service server. The method comprises providing a priority request for the elevated priority to a first MC service server. The method comprises obtaining a notification of grant of the request from the first MC service server.

According to a ninth aspect there is presented an MC service server for priority notification of an MC service in a network. The MC service server comprises processing circuitry. The processing circuitry is configured to cause the MC service server to obtain an indication of a need for elevated priority of use of network resources for a service provided by the MC service server. The processing circuitry is configured to cause the MC service server to provide a priority request for the elevated priority to a first MC service server. The processing circuitry is configured to cause the MC service server to obtain a notification of grant of the request from the first MC service server.

According to a tenth aspect there is presented an MC service server for priority notification of an MC service in a network. The MC service server comprises processing circuitry and a storage medium. The storage medium stores instructions that, when executed by the processing circuitry, cause the MC service server to perform operations, or steps. The operations, or steps, cause the MC service server to obtain an indication of a need for elevated priority of use of network resources for a service provided by the MC service server. The operations, or steps, cause the MC service server to provide a priority request for the elevated priority to a first MC service server. The operations, or steps, cause the MC service server to obtain a notification of grant of the request from the first MC service server.

According to an eleventh aspect there is presented an MC service server for priority notification of an MC service in a network. The MC service server comprises an obtain module configured to obtain an indication of a need for elevated priority of use of network resources for a service provided by the MC service server. The MC service server comprises a provide module configured to provide a priority request for the elevated priority to a first MC service server. The MC service server comprises an obtain module configured to obtain a notification of grant of the request from the first MC service server.

According to a twelfth aspect there is presented a computer program for priority notification of an MC service in a network. The computer program comprises computer program code which, when run on processing circuitry of an MC service server, causes the MC service server to perform a method according to the eight aspect.

According to a thirteenth aspect there is presented a method for priority notification of an MC service in a network. The method is performed by a third MC service server. The method comprises obtaining, from a first MC service server, a notification of grant of a priority request from a second MC service server for elevated priority of use of network resources for a service provided by the second MC service server.

According to a fourteenth aspect there is presented an MC service server for priority notification of an MC service in a network. The MC service server comprises processing circuitry. The processing circuitry is configured to cause the MC service server to obtain, from a first MC service server, a notification of grant of a priority request from a second MC service server for elevated priority of use of network resources for a service provided by the second MC service server.

According to a fifteenth aspect there is presented an MC service server for priority notification of an MC service in a network. The MC service server comprises processing circuitry and a storage medium. The storage medium stores instructions that, when executed by the processing circuitry (210), cause the MC service server to obtain, from a first MC service server, a notification of grant of a priority request from a second MC service server for elevated priority of use of network resources for a service provided by the second MC service server.

According to a sixteenth aspect there is presented an MC service server for priority notification of an MC service in a network. The MC service server comprises an obtain module configured to obtain, from a first MC service server, a notification of grant of a priority request from a second MC service server for elevated priority of use of network resources for a service provided by the second MC service server.

According to a seventeenth aspect there is presented a computer program for priority notification of an MC service in a network. The computer program comprises computer program code which, when run on processing circuitry of an MC service server, causes the MC service server to perform a method according to the thirteenth aspect.

According to an eighteenth aspect there is presented a method for priority notification of an MC service. The method is performed by an MC client node. The method comprises obtaining, from a first MC service server, a notification of grant of a priority request from a second MC service server for elevated priority of use of network resources for a service provided by the second MC service server.

According to a nineteenth aspect there is presented an MC client node for priority notification of an MC service in a network. The MC client node comprises processing circuitry. The processing circuitry is configured to cause the MC client node to obtain, from a first MC service server, a notification of grant of a priority request from a second MC service server for elevated priority of use of network resources for a service provided by the second MC service server.

According to a twentieth aspect there is presented an MC client node for priority notification of an MC service in a network. The MC client node comprises processing circuitry and a storage medium. The storage medium stores instructions that, when executed by the processing circuitry, cause the MC client node to obtain, from a first MC service server, a notification of grant of a priority request from a second MC service server for elevated priority of use of network resources for a service provided by the second MC service server.

According to a twenty first aspect there is presented an MC client node for priority notification of an MC service in a network. The MC client node comprises an obtain module configured to obtain, from a first MC service server, a notification of grant of a priority request from a second MC service server for elevated priority of use of network resources for a service provided by the second MC service server.

According to a twenty second aspect there is presented a computer program for priority notification of an MC service in a network, the computer program comprising computer program code which, when run on processing circuitry of an MC client node, causes the MC client node to perform a method according to the eighteenth aspect.

According to a twenty third aspect there is presented a computer program product comprising a computer program according to at least one of the fifth aspect, the tenth aspect, the fifteenth aspect, and the twentieth aspect, and a computer readable storage medium on which the computer program is stored. The computer readable storage medium can be a non-transitory computer readable storage medium.

Advantageously these methods, these MC service servers, these MC client nodes, and these computer programs provide efficient handling of priorities of MC services in a network.

Advantageously these methods, these MC service servers, these MC client nodes, and these computer programs enable efficient priority treatment handling among several MC services as well as providing an efficient way to notify users (as defined by the client nodes) in the area in which MC priority treatment is needed.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2, 3, 4, 5 are flowcharts of methods according to embodiments;

FIG. 10 is a schematic diagram showing functional modules of an MC client node according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
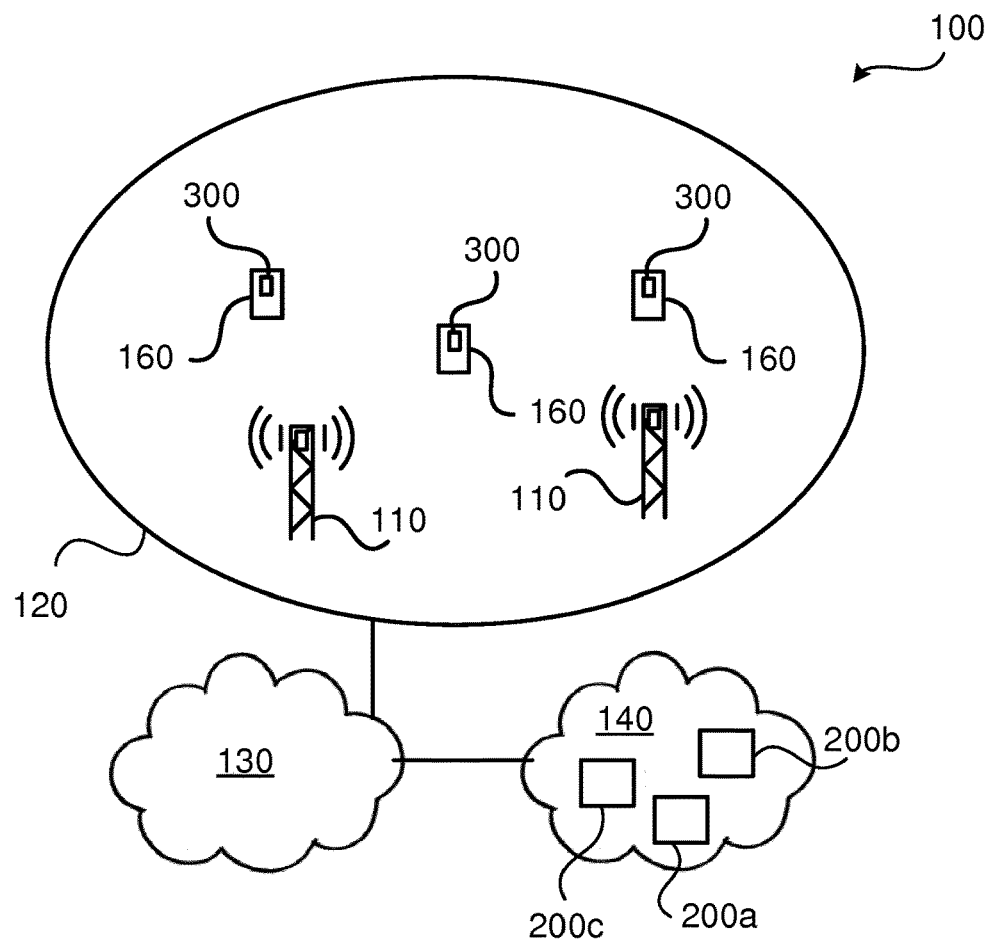
FIG. 1 is a schematic diagram illustrating a network according to embodiments.

FIG. 1 is a schematic diagram illustrating a network 100 where embodiments presented herein can be applied. The network 100 may be regarded as a wireless network. The wireless network provides services to client nodes 300. Each client node 300 may be provided in, or installed on, a respective wireless device 160. In other words, a step, action, or similar that is performed by a client node 300 is, in some aspects, also performed by the wireless device 160 in which the client node 300 is provided.

The network 100 comprises a radio access network 120, a core network 130, and a service network 140. The network 100 further comprises MC service servers 200*a*, 200*b*, 200*c*. The MC service servers 200*a*, 200*b*, 200*c* may be provided in, or installed on, a radio access network node 110 or in another entity, device, or function in the radio access network 120, in an entity, device, or function of the core network 130, or in an entity, device, or function of the service network 140.

The radio access network 120 is operatively connected to the core network 130 which in turn is operatively connected to the service network 140. The radio access network nodes 110 thereby enables the wireless devices 160, and hence the client nodes 300 in the respective wireless devices 160, to access services and exchange data as provided by the service network 140. Particularly, the client nodes 300 are thereby enabled to communicate with the MC service servers 200*a*, 200*b*, 200*c*.

Examples of wireless devices 160 include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, Node Bs, evolved Node Bs, gigabit Node Bs, access nodes, and access points.

As the skilled person understands, the network 100 may comprise a plurality of radio access network nodes 110, each providing network access to a plurality of wireless devices 160. The herein disclosed embodiments are not limited to any particular number of radio access network nodes 110, client nodes 300, wireless devices 160, or MC service servers 200*a*, 200*b*, 200*c*. As the skilled person understands there could be more than three MC service servers 200*a*, 200*b*, 200*c* in the network 100. However, for clarity, and in order not to obscure the description of the present inventive concept, only three MC service servers 200*a*, 200*b*, 200*c*, each taking a separate role, are needed in order to present the present inventive concept in a complete manner. The nodes indicated herein may be seen as functions, where each function may be implemented in one or more physical entities.

In group communication, priority decision information is important for both servers and clients located in an area that is subject for priority treatment. Current handling of group communication calls does not support this in an efficient way.

As disclosed above there is thus a need to manage priority treatment among different kind of services and service platforms. In more detail, there is a need for improved priority management between different MC service platforms as well as between different MC service providers. In FIG. 1 each MC service server 200a, 200b, 200c could represent one MC service platform and/or an MC service provider.

Traditionally, priority decisions for MC services are handled individually in each MC service, and thus individually by each MC service server 200a, 200b, 200c. In contrasts thereto, the herein disclosed embodiments are based on coordination between MC services, of the same or different kind, and thus between the MC service servers 200a, 200b, 200c in order to support priority decisions in an efficient manner.

In general terms, an MC service, or just service for short, corresponds to a service provided by an MC service server, e.g. a transmission of data such as e.g. text, audio, images, or video.

Below, MC service server 200a will take the role of a priority arbitrator and be denoted a first MC service server 200a. MC service server 200b will take the role of an MC service server having an MC service needing an elevated priority and will be denoted a second MC service server 200b. MC service server 200c will represent other MC service servers in the network 100 and will be denoted a third MC service server 200c.

Reference is now made to FIG. 2 illustrating a method for determining priority of use of network resources used by an MC service in a network 100 as performed by the first MC service server 200a according to an embodiment.

The first MC service server 200a acting as the priority arbitrator is configured to grant the right to use elevated priority to other MC service servers 200b, 200c.

As will be disclosed below the second MC service server 200b in step s206 provides a priority request for the elevated priority to the first MC service server 200a. It is assumed that the first MC service server 200a receives this priority request and thus is configured to perform step S106:

S106: The first MC service server 200a obtains a priority request from the second MC service server 200b. The priority request is for elevated priority of use of network resources for a service provided by the second MC service server 200b.

The first MC service server 200a then handles the priority request by determining whether to grant, reject, or queue the priority request. Hence, the first MC service server 200a is configured to perform step S108:

S108: The first MC service server 200a determines whether to grant, reject, or queue the priority request.

When the request is granted, notifications are sent to the second MC service server 200b and the at least one third MC service server 200c. Particularly, the first MC service server 200a is configured to perform step S110a:

S110a: The first MC service server 200a, when determined to grant the priority request, provides a first notification of the grant to the second MC service server 200b. The first MC service server 200a, when determined to grant the priority request, also provides a second notification of the grant to at least one third MC service server 200c.

This results in a coordination between MC services, of the same or different kind, and thus between the MC service servers 200a, 200b, 200c, further resulting in priority decisions being made in an efficient manner Embodiments relating to further details of determining priority of use of network resources used by an MC service in a network 100 as performed by the first MC service server 200a will now be disclosed.

The network resources for the MC service could be radio resources in the frequency and/or time domain, transport resources in terms of transmission network capacity, and/or processing resources in network nodes in the network (100).

The priority, or elevated priority, of using the network resource could correspond to the priority of the MC service over other MC services that use, or may potentially use, the same network resource. The priority level could be used at admission control of the network resources as well in real-time for resources scheduling decisions, as well as defining differentiated service treatment on the transport layer.

In some aspects the first MC service server 200a is assigned as priority arbitrator before obtaining the priority request from the second MC service server 200b in step S106. That is, according to an embodiment the first MC service server 200a is configured to perform (optional) step S102:

S102: The first MC service server 200a obtains a notification designating the first MC service server 200a as a priority arbitrator for determining whether to grant, reject, or queue priority requests from the second MC service server 200b and the at least one third MC service server 200c.

This enables priority requests to be handled in a centralized manner. The notification in step S102 could be obtained either from another MC service server 200b, 20c, or from external input, such as from user input. Once the first MC service server 200a has obtained the notification, the first MC service server 200a could notify the other MC service servers in the network 100 that it has taken the role as priority arbitrator. Thus, according to an embodiment the first MC service server 200a is configured to perform (optional) step S104:

S104: The first MC service server 200a notifies the second MC service server 200b and the at least one third MC service server 200c that the first MC service server 200a is designated as the priority arbitrator.

There could be different types of information included in the priority request obtained in step S106 from the second MC service server 200b. According to an embodiment the priority request comprises at least one property from a group comprising: identification of geographical area in which the network resources are to be used, a requested priority level, time constraints, service type of the service provided by the second MC service, and needed bandwidth of the network resources.

There are different ways in which the first MC service server 200a could make the determination in step S108 regarding the priority request.

In some aspects the first MC service server 200a makes the determination regarding the priority request based on the information included in the priority request. Particularly, according to an embodiment the determining in step S108 whether to grant, reject, or queue the priority request is based on the at least one property included in the priority request.

In some aspects the first MC service server 200a makes the determination regarding the priority request based on MC properties. Particularly, according to an embodiment the determining in step S108 whether to grant, reject, or queue the priority request is based on at least one of: MC service type, MC incident type, MC organization information, First responder dispatcher decision, and current network status and availability.

In some aspects the first MC service server 200a makes the determination regarding the priority request based on network information. Particularly, according to an embodiment the determining in step S108 whether to grant, reject, or queue the priority request is based on at least one of: request information provided in the priority request, status information indicating operation of at least one of the second MC service server 200b, and the at least one third MC service server 200c.

There could be different types of first notification and second notification provided in step S110a. For example, the first notification could be provided in an MC priority granted message. For example, the first notification could further comprise a time limit for how long time period the elevated priority has been granted for the second MC service server 200b. For example, the second notification could be provided in an MC priority taken message.

There could be different ways for the first MC service server 200a to act once not granting the priority request.

According to some aspects the priority request is queued. Hence, according to an embodiment the first MC service server 200a is configured to perform (optional) step S110b:

S110b: The first MC service server 200a notifies the second MC service server 200b with a queue status response when determined to queue the priority request. The queue status response comprises queuing information of the priority request. The queuing information could comprise information about the current request's queue position. The queuing information could comprise information about how long the priority request is to be queued before the priority request is granted. The queuing information could comprise information about any other currently prioritized services, and optionally the priority level of any such currently prioritized services, in the network 100.

According to some aspects the priority request is rejected. Hence, according to an embodiment the first MC service server 200a is configured to perform (optional) step S110c:

S110c: The first MC service server 200a notifies the second MC service server 200b with a priority request rejection when determined to reject the priority request.

It hereinafter assumed that the priority request is granted.

The first MC service server 200a could notify MC users in the geographical area where elevated priority has been granted. Particularly, according to an embodiment the first MC service server 200a is configured to perform (optional) step S112:

S112: The first MC service server 200a notifies at least one MC client node 300 of the grant.

This provides a priority alert message to users competing on the same resources.

In some aspects only those client nodes 300 in the geographical area affected by the elevated priority are notified. Particularly, according to an embodiment the at least one MC client node 300 is only notified when the at least one MC client node 300 is located in, or proximate to, a geographical area for which the elevated priority of use of network resources was granted.

As will be disclosed below, the second MC service server 200b in (optional) step S214 notifies the first MC service server 200a of release of the elevated priority of use of the network resources. Hence, according to an embodiment the first MC service server 200a is configured to perform (optional) step S114:

S114: The first MC service server 200a obtains a notification from the second MC service server 200b of release of the elevated priority of use of the network resources.

This means that another MC service server could request elevated priority of one of its services and the MC service servers could thus be informed that the elevated priority has been released. Therefore, according to an embodiment the first MC service server 200a is configured to perform (optional) step S116:

S116: The first MC service server 200a notifies the at least one third MC service server 200c of the release.

Reference is now made to FIG. 3 illustrating a method for priority notification of an MC service in a network 100 as performed by the second MC service server 200b according to an embodiment.

A need for high priority level is identified by the second MC service server 200b. The second MC service server 200b is therefore configured to perform step S204:

S204: The second MC service server 200b obtains an indication of a need for elevated priority of use of network resources for a service provided by the second MC service server 200b.

The priority level identified is above the level of priority that the second MC service server 200b can utilise without centralized priority arbitration. The second MC service server 200b therefore sends an MC priority request to the first MC server service 200a being assigned the priority arbitrator role. The second MC service server 200b is therefore configured to perform step S206:

S206: The second MC service server 200b provides a priority request for the elevated priority to the first MC service server 200a.

As disclosed above, the first MC service server 200a, when determined to grant the priority request, provides in step S110a a first notification of the grant to the second MC service server 200b. It is assumed that the second MC service server 200b receives this notification and hence that the second MC service server 200b is configured to perform step S208:

S208: The second MC service server 200b obtains a notification of grant of the request from the first MC service server 200a.

Embodiments relating to further details of priority notification of an MC service in a network 100 as performed by the second MC service server 200b will now be disclosed.

As disclosed above, the first MC service server 200a in optional step S104 notifies the second MC service server 200b that the first MC service server 200a is designated as the priority arbitrator. Therefore, according to an embodiment the second MC service server 200b is configured to perform (optional) step S202:

S202: The second MC service server 200b obtains a notification from the first MC service server 200a that the first MC service server 200a has been designated as a priority arbitrator for determining whether to grant, reject, or queue priority requests from the second MC service server 200b.

Once the second MC service server 200b has obtained the grant in step S208 the second MC service server 200b could utilize the elevated priority for the service provided by the second MC service server 200b. Particularly, according to an embodiment the second MC service server 200b is configured to perform (optional) step S210:

S210: The second MC service server 200*b* provides the service to at least one MC client node 300. The service is provided using the elevated priority of the network resources.

It is assumed that there is and end to how long the second MC service server 200*b* could provide the service using the elevated priority of the network resources. For example, as disclosed above, the notification obtained in step S208 from the first MC service server 200*a* could comprise a time limit for how long time period the elevated priority has been granted for the second MC service server 200*b*, which defines and upper limit of how long the second MC service server 200*b* could provide the service using the elevated priority of the network resources. Particularly, according to an embodiment the second MC service server 200*b* is configured to perform (optional) step S212:

S212: The second MC service server 200*b* obtains an indication of ceased need for the elevated priority of use of the network resources.

Once the service does not need to be provided using the elevated priority of the network resources, or when the time limit has passed, the second MC service server 200*b* could pass this information to the first MC service server 200*a*. Thus, according to an embodiment the second MC service server 200*b* is configured to perform (optional) step S214:

S214: The second MC service server 200*b* notifies the first MC service server 200*a* of release of the elevated priority of use of the network resources.

Reference is now made to FIG. 4 illustrating a method for priority notification of an MC service in a network 100 as performed by the third MC service server 200*c* according to an embodiment.

As disclosed above, the first MC service server 200*a* provides in step S110*a* a second notification of the grant to the at least one third MC service server 200*c*. It is assumed that the at least one third MC service server 200*c* receives this notification. Hence, the third MC service server 200*c* is configured to perform step S304:

S304: The third MC service server 200*c* obtains, from the first MC service server 200*a*, a notification of grant of a priority request from a second MC service server 200*b* for elevated priority of use of network resources for a service provided by the second MC service server 200*b*.

Embodiments relating to further details of priority notification of an MC service in a network 100 as performed by the third MC service server 200*c* will now be disclosed.

As disclosed above, the first MC service server 200*a* in optional step S104 notifies the at least one third MC service server 200*c* that the first MC service server 200*a* is designated as the priority arbitrator. Therefore, according to an embodiment the third MC service server 200*c* is configured to perform step S302:

S302: The third MC service server 200*c* obtains a notification from the first MC service server 200*a* that the first MC service server 200*a* has been designated as a priority arbitrator for determining whether to grant, reject, or queue priority requests from the third MC service server 200*c*.

As disclosed above, the first MC service server 200*a* in optional step S116 notifies the at least one third MC service server 200*c* of the release of the elevated priority of use of network resources for the service provided by the second MC service server 200*b*. Hence, according to an embodiment the third MC service server 200*c* is configured to perform step S306:

S306: The third MC service server 200*c* obtains a notification from the first MC service server 200*a* of release of the elevated priority of use of the network resources.

The third MC service server 200*c* could then, if identifying a need for elevated priority of use of network resources for a service provided by the third MC service server 200*c*, act as the second service server 200*b* (and thus perform steps S202-S214). Alternatively, the third MC service server 200 could then act as the first MC service server 200*a* (and thus perform steps S102-S116). Likewise, any of the first MC service server 200*a* and the second MC service server 200*b* could then take the role of any of the first MC service server 200*a*, the second MC service server 200*b*, or the third MC service server 200*c*.

Reference is now made to FIG. 5 illustrating a method for priority notification of an MC service in a network 100 as performed by the MC client node 300 according to an embodiment.

As disclosed above, the first MC service server 200*a* in optional step S112 notifies at least one MC client node 300 of the grant. It is assumed that at least one of the MC client nodes 300 receives this notification. Hence, the MC client node 300 is configured to perform step S402:

S402: The MC client node 300 obtains, from the first MC service server 200*a*, a notification of grant of a priority request from a second MC service server 200*b* for elevated priority of use of network resources for a service provided by the second MC service server 200*b*.

The MC client node 300 could then use the service provided by the second MC service server 200*b* with the elevated priority. The MC client node 300 could also use the information provided in the notification to make a decision regarding participating in other MC communication services or not. For example, the MC client node 300 could determine to refrain from participating in any other MC communication services when taking part in a service with elevated priority in order for any such other MC communication services to not interfere with the service with elevated priority.

Embodiments equally applicable to any of the above disclosed embodiments for the first MC service server 200*a*, the second MC service server 200*b*, and the at least one third MC service server 200*c*, as well as for the MC client node 300 will now be disclosed.

There could be different types of networks 100. According to an embodiment the first MC service server 200*a*, the second MC service server 200*b*, and the at least one third MC service server 200*c* are part of same trusted network domain. According to an embodiment the first MC service server 200*a*, the second MC service server 200*b*, and the at least one third MC service server 200*c* are part of a group communications system.

There could be different types of network resources. According to an embodiment the network resources are used for at least one of: transporting data (with prioritized transmission, elevated bit rate, reduced queuing, etc.) of the service provided by the second MC service server 200*b*, prioritized admission control, and prioritized radio scheduling.

There could be different types of services. According to an embodiment the service provided by the second MC service server 200*b* is an MC push-to-talk service, an MC video communications service, an MC audio communications service, an MC streaming service, an MC data access service, an MC machine type communication service, or an MC short message service.

There could be different types of messages used for communicating any of the above disclosed notifications, requests, grants, indications, etc. In some aspects any messages communicated between the first MC service server 200a, the second MC service server 200b, and the at least one third MC service server 200c are communicated using a call control protocol. Non-limiting examples of call control protocols are the Session Initiation Protocol (SIP), the Session Announcement Protocol (SAP), Hypertext Transfer Protocol (HTTP) and the Realtime Transmission Control Protocol (RTCP).

Figure 6:
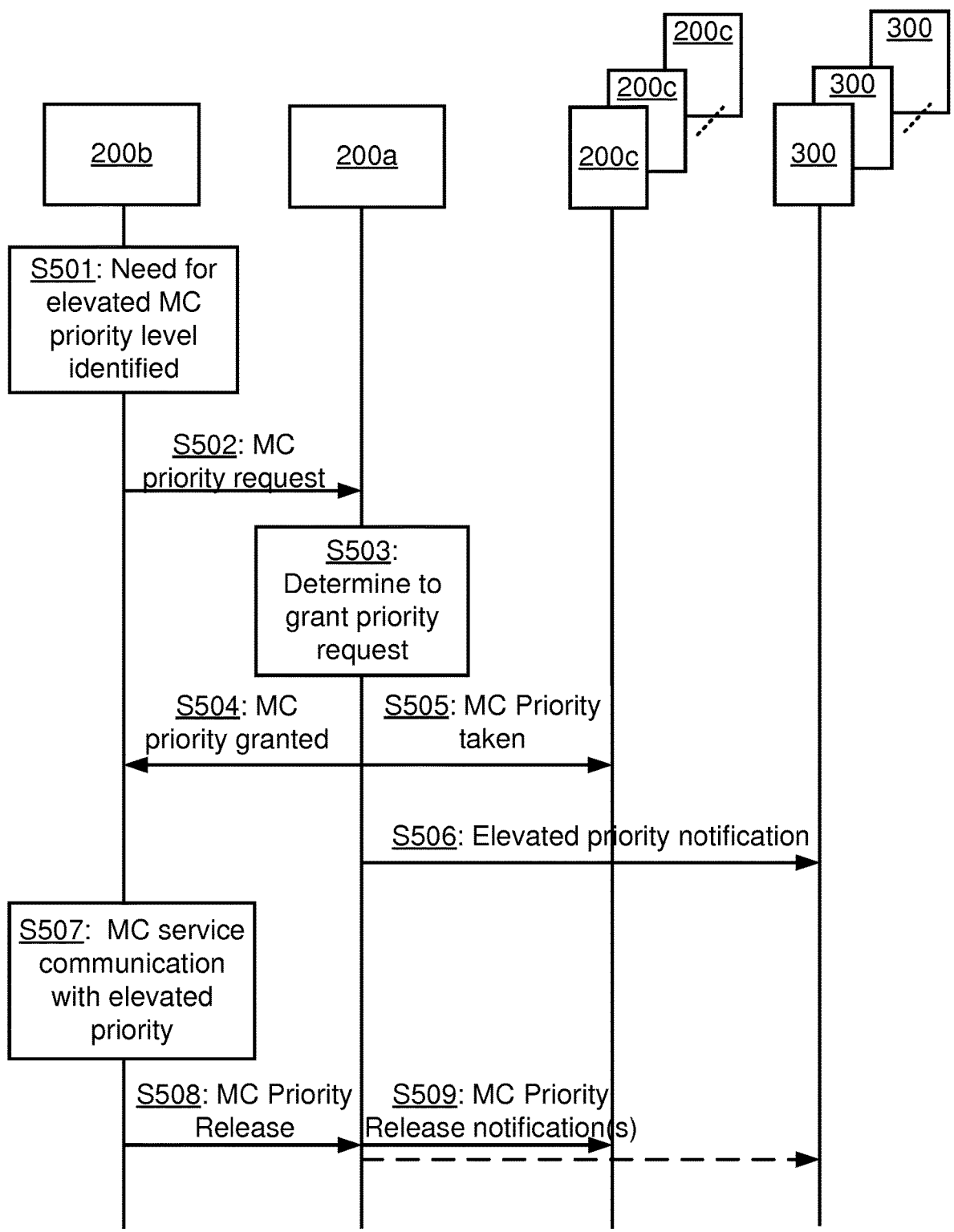
FIG. 6 is a signalling diagram according to embodiments.

One particular embodiment for determining priority of use of network resources used by an MC service in a network 100 and priority notification of an MC service in a network 100 based on at least some of the above disclosed embodiments will now be disclosed in detail with reference to the signalling diagram of FIG. 6.

S501: A need for high priority level is identified by the second MC service server 200b. The priority level identified is above the level of priority that the second MC service server 200b can utilise without centralized priority arbitration. In some aspects, this step corresponds to step S204 discussed above with reference to FIG. 3.

S502: The second MC service server 200b sends an MC priority request to the first MC server service 200a being assigned the priority arbitrator role.

The request includes the geographical area, the priority level, service type and needed capacity. In some aspects, this step corresponds to step S106 discussed above with reference to FIG. 2 and to step S206 discussed above with reference to FIG. 3.

S503: The first MC server service 200a determines to grant, reject or queue the request for elevated priority. Examples of properties on which the first MC server service 200a makes this determination have been disclosed above.

In some aspects, this step corresponds to step S108 discussed above with reference to FIG. 2.

S504: The first MC server service 200a grants the second MC service server 200b the elevated priority and notifies the second MC service server 200b thereof. The notification might include a time limit for the granted elevated priority. In some aspects, this step corresponds to step S110a discussed above with reference to FIG. 2 and to step S208 discussed above with reference to FIG. 3.

S505: The first MC server service 200a notifies other MC service servers (as defined by the at least one third MC server service 200c) that elevated priority is granted to other MC services. In some aspects, this step corresponds to step S304 discussed above with reference to FIG. 2.

S506: The first MC server service 200a (optionally) sends a priority notification to MC client nodes 300, such as to those MC client nodes 300 located in the geographical area in which the priority was granted. The priority notification could be sent over a multicast bearer. In some aspects, this step corresponds to step S212 discussed above with reference to FIG. 2 and step S402 discussed above with reference to FIG. 5.

S507: The second MC service server 200b utilizes the elevated priority when requesting resources of new or existing MC service communication in the network 100. In some aspects, this step corresponds to step S210 discussed above with reference to FIG. 3.

S508: The second MC service server 200b requests the first MC server service 200a to release the MC priority or notifies the first MC server service 200a that the MC priority has been released. In some aspects, this step corresponds to step S114 of FIG. 2 and to steps S212, S214 discussed above with reference to FIG. 3.

S509: The first MC server service 200a notifies the at least one third MC server service 200c that the MC priority has been released. Optionally, this notification could be sent to MC client nodes 300. In some aspects, this step corresponds to step S116 discussed above with reference to FIG. 2 and step S306 discussed above with reference to FIG. 4.

Figure 7:
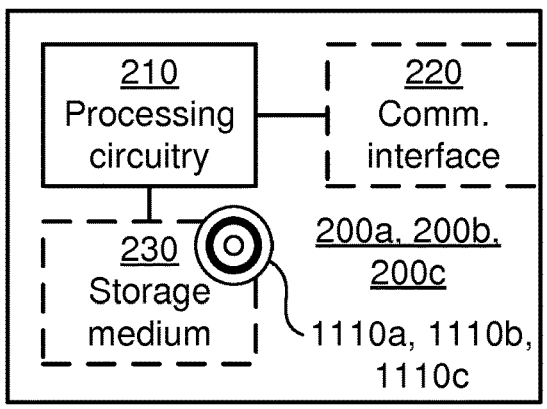
FIG. 7 is a schematic diagram showing functional units of an MC service server according to an embodiment.

FIG. 7 schematically illustrates, in terms of a number of functional units, the components of an MC service server 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the MC service server 200a, 200b, 200c to perform a set of operations, or steps, S102-S116, S202-S214, S302-S306, as disclosed above. For example, the storage medium 230 may store the set of operations, and the processing circuitry 210 may be configured to retrieve the set of operations from the storage medium 230 to cause the MC service server 200a, 200b, 200c to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The MC service server 200a, 200b, 200c may further comprise a communications interface 220 for communications at least with another MC service server 200a, 200b, 200c and MC client nodes 300. As such the communications interface 220 may comprise one or more transmitters and receivers, comprising analogue and digital components.

The processing circuitry 210 controls the general operation of the MC service server 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the MC service server 200a, 200b, 200c are omitted in order not to obscure the concepts presented herein.

Figure 8:
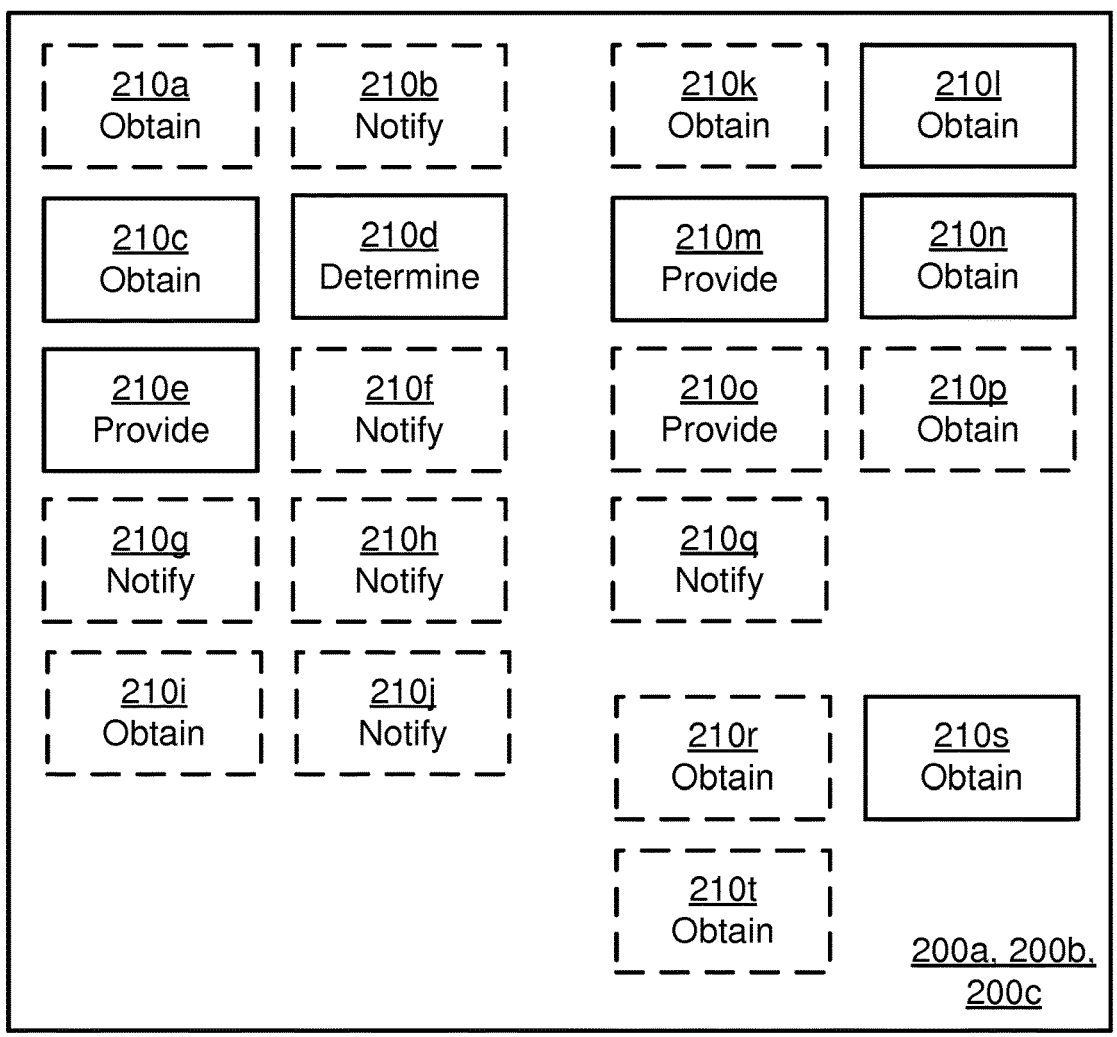
FIG. 8 is a schematic diagram showing functional modules of an MC service server according to an embodiment.

FIG. 8 schematically illustrates, in terms of a number of functional modules, the components of an MC service server 200a, 200b, 200c according to an embodiment. The MC service server 200a, 200b, 200c of FIG. 8 comprises a number of functional modules.

An MC service server configured as the first MC service server 200a comprises an obtain module 210c configured to perform step S106, a determine module 210d configured to perform step 108, and a provide module 210e configured to perform step S110a. An MC service server configured as the first MC service server 200a could further comprise a number of optional functional modules, such as any of an obtain module 210a configured to perform step S102, a notify module 210b configured to perform step S104, a notify module 210f configured to perform step S110b, a notify 210g module configured to perform step S110c, a notify module 210h configured to perform step S112, an obtain module 210i configured to perform step S114, and a notify module 210j configured to perform step S116.

An MC service server configured as the second MC service server 200b comprises an obtain module 210l configured to perform step S204, a provide module 210m configured to perform step S206, and an obtain module 210*n* configured to perform step S208. An MC service server configured as the second MC service server 200*b* could further comprise a number of optional functional modules, such as any of an obtain module 210*k* configured to perform step S202, a provide module 210*o* configured to perform step S210, an obtain module 210*p* configured to perform step S212, and a notify module 210*q* configured to perform step S214.

An MC service server configured as the third MC service server 200*c* comprises an obtain module 210*s* configured to perform step S304. An MC service server configured as the third MC service server 200*c* could further comprise a number of optional functional modules, such as any of an obtain module 210*r* configured to perform step S302, and an obtain module 210*t* configured to perform step S306.

In general terms, each functional module 210*a*-210*t* may be implemented in hardware or in software. Preferably, one or more or all functional modules 210*a*-210*t* may be implemented by the processing circuitry 210, possibly in cooperation with the communications interface 220 and the storage medium 230. The processing circuitry 210 may thus be arranged to from the storage medium 230 fetch instructions as provided by a functional module 210*a*-210*t* and to execute these instructions, thereby performing any steps of the MC service server 200*a*, 200*b*, 200*c* as disclosed herein.

The MC service server 200*a*, 200*b*, 200*c* may be provided as a standalone device or as a part of at least one further device. For example, the MC service server 200*a*, 200*b*, 200*c* may be provided in a node of the radio access network 120 or in a node of the core network 130 or in a node of the service network 140. Alternatively, functionality of the MC service server 200*a*, 200*b*, 200*c* may be distributed between at least two devices, or nodes. These at least two nodes, or devices, may either be part of the same network part (such as the radio access network or the core network or the service network) or may be spread between at least two such network parts.

Functionality of the MC service server 200*a*, 200*b*, 200*c* may be implemented at the service layer of the protocol stack. In general terms, instructions that are required to be performed in real time may be performed in a device, or node, operatively closer to the radio access network 120 than instructions that are not required to be performed in real time. In this respect, at least part of the MC service server 200*a*, 200*b*, 200*c* may reside in the radio access network 120, such as in the radio access network node 110, for cases when embodiments as disclosed herein are performed in real time.

Thus, a first portion of the instructions performed by the MC service server 200*a*, 200*b*, 200*c* may be executed in a first device, and a second portion of the of the instructions performed by the MC service server 200*a*, 200*b*, 200*c* may be executed in a second device; the herein disclosed embodiments are not limited to any particular number of devices on which the instructions performed by the MC service server 200*a*, 200*b*, 200*c* may be executed.

Hence, the methods according to the herein disclosed embodiments are suitable to be performed by an MC service server 200*a*, 200*b*, 200*c* residing in a cloud computational environment. Therefore, although a single processing circuitry 210 is illustrated in FIG. 7 the processing circuitry 210 may be distributed among a plurality of devices, or nodes. The same applies to the functional modules 210*a*-210*t* of FIG. 8 and the computer programs 1120, 1120*b*, 1120*c* of FIG. 11 (see below).

Figure 9:
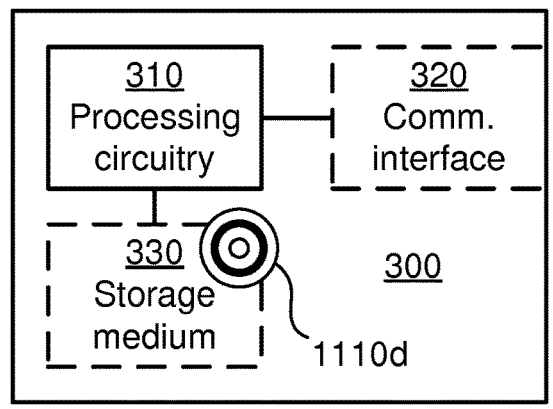
FIG. 9 is a schematic diagram showing functional units of an MC client node according to an embodiment.

FIG. 9 schematically illustrates, in terms of a number of functional units, the components of an MC client node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*d* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the MC client node 300 to perform a set of operations, or steps, such as step S402, as disclosed above. For example, the storage medium 330 may store the set of operations, and the processing circuitry 310 may be configured to retrieve the set of operations from the storage medium 330 to cause the MC client node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The MC client node 300 may further comprise a communications interface 320 for communications at least with at least one of the MC service server 200*a*, 200*b*, 200*c*. As such the communications interface 320 may comprise one or more transmitters and receivers, comprising analogue and digital components.

The processing circuitry 310 controls the general operation of the MC client node 300 e.g. by sending data and control signals to the communications interface 320 and the storage medium 330, by receiving data and reports from the communications interface 320, and by retrieving data and instructions from the storage medium 330. Other components, as well as the related functionality, of the MC client node 300 are omitted in order not to obscure the concepts presented herein.

FIG. 10 schematically illustrates, in terms of a number of functional modules, the components of an MC client node 300 according to an embodiment. The MC client node 300 of FIG. 10 comprises an obtain module 310*a* configured to perform step S402. The MC client node 300 of FIG. 10 may further comprise a number of optional functional modules, such represented by module 310*b*. In general terms, each functional module 310*a*-310*b* may be implemented in hardware or in software. Preferably, one or more or all functional modules 310*a*-310*b* may be implemented by the processing circuitry 310, possibly in cooperation with the communications interface 320 and the storage medium 330. The processing circuitry 310 may thus be arranged to from the storage medium 330 fetch instructions as provided by a functional module 310*a*-310*b* and to execute these instructions, thereby performing any steps of the MC client node 300 as disclosed herein.

The client node 300 may be provided as a standalone device or as a part of at least one further device. For example, the client node 300 may be provided in a wireless device 160.

Figure 11:
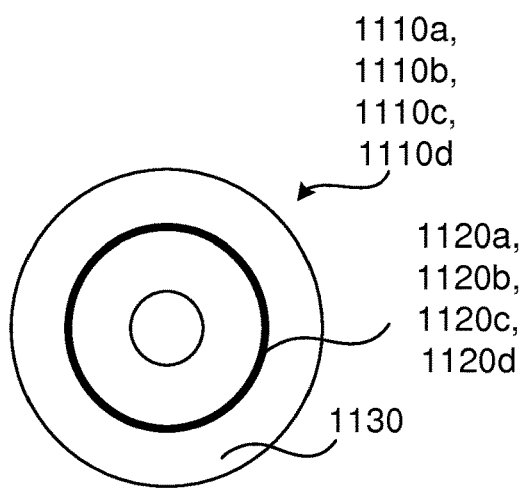
FIG. 11 shows one example of a computer program product comprising computer readable means according to an embodiment.

FIG. 11 shows one example of a computer program product 1110*a*, 1110*b*, 1110*c*, 1110*d* comprising computer readable means 1130. On this computer readable means 1130, a computer program 1120*a* can be stored, which computer program 1120*a* can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the first MC service server 200a as herein disclosed. On this computer readable means 1130, a computer program 1120b can be stored, which computer program 1120b can cause the processing circuitry 210 and thereto operatively coupled entities and devices, such as the communications interface 220 and the storage medium 230, to execute methods according to embodiments described herein. The computer program 1120b and/or computer program product 1110b may thus provide means for performing any steps of the second MC service server 200b as herein disclosed. On this computer readable means 1130, a computer program 1120c can be stored, which computer program 1120c can cause the processing circuitry 210 and thereto operatively coupled entities and devices, such as the communications interface 220 and the storage medium 230, to execute methods according to embodiments described herein. The computer program 1120c and/or computer program product 1110c may thus provide means for performing any steps of the third MC service server 200c as herein disclosed. On this computer readable means 1130, a computer program 1120d can be stored, which computer program 1120d can cause the processing circuitry 310 and thereto operatively coupled entities and devices, such as the communications interface 320 and the storage medium 330, to execute methods according to embodiments described herein. The computer program 1120d and/or computer program product 1110d may thus provide means for performing any steps of the MC client node 300 as herein disclosed.

In the example of FIG. 11, the computer program product 1110a, 1110b, 1110c, 1110d is illustrated as an optical disc, such as a CD (compact disc) or a DVD (digital versatile disc) or a Blu-Ray disc. The computer program product 1110a, 1110b, 1110c, 1110d could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b, 1120c, 1120d is here schematically shown as a track on the depicted optical disk, the computer program 1120a, 1120b, 1120c, 1120d can be stored in any way which is suitable for the computer program product 1110a, 1110b, 1110c, 1110d.

Some of the embodiments described above can be summarized in the following itemized manner:

Item 1. A method for determining priority of use of network resources used by a Mission Critical, MC, service in a network 100, the method being performed by a first MC service server 200a and a second MC service server 200b, the method comprising:

obtaining S204, S501 by the second MC service server 200b an indication of a need for elevated priority of use of network resources for a service provided by the second MC service server 200b;

obtaining S106, S502 by the first MC service server 200a a priority request from the second MC service server 200b for elevated priority of use of network resources for the service provided by the second MC service server 200b;

determining S108, S503 by the first MC service server 200a whether to grant, reject, or queue the priority request; and when determined to grant the priority request: and obtaining S110a, S208, S504 by the second MC service server 200b a first notification of the grant of the request from the first MC service server 200a.

Item 2. A method for determining priority of use of network resources used by a Mission Critical, MC, service in a network 100, the method being performed by a first MC service server 200a, the method comprising:

obtaining S106 a priority request from a second MC service server 200b for elevated priority of use of network resources for a service provided by the second MC service server 200b;

determining S108 whether to grant, reject, or queue the priority request; and when determined to grant the priority request:

providing S110a a first notification of the grant to the second MC service server 200b and a second notification of the grant to at least one third MC service server 200c.

Item 3. The method according to item 2, further comprising:

obtaining S102 a notification designating the first MC service server 200a as a priority arbitrator for determining whether to grant, reject, or queue priority requests from the second MC service server 200b and the at least one third MC service server 200c; and notifying S104 the second MC service server 200b and the at least one third MC service server 200c that the first MC service server 200a is designated as the priority arbitrator.

Item 4. The method according to item 2, wherein determining whether to grant, reject, or queue the priority request is based on at least one piece of property information provided in the priority request.

Item 5. The method according to item 4, wherein the at least one piece of property information comprises at least one property from a group comprising identification of geographical area in which the network resources are to be used, a requested priority level, time constraints, service type of the service provided by the second MC service, and needed bandwidth of the network resources.

Item 6. The method according to item 2, wherein determining whether to grant, reject, or queue the priority request is based on at least one of MC service type, MC incident type, MC organization information, first responder dispatcher decision, and current network status and availability.

Item 7. The method according to item 2, wherein determining whether to grant, reject, or queue the priority request is based on at least one of request information provided in the priority request, status information indicating operation of at least one of the second MC service server 200b, and the at least one third MC service server 200c.

Item 8. The method according to item 2, wherein the first notification is provided in an MC priority granted message.

Item 9. The method according to item 2, wherein the first notification further comprises a time limit for how long time period the elevated priority has been granted for the second MC service server 200b.

Item 10. The method according to item 2, wherein the second notification is provided in an MC priority taken message.

Item 11. The method according to item 2, further comprising:
notifying S112 at least one MC client node 300 of the grant.

Item 12. The method according to item 11, wherein the at least one MC client node 300 only is notified when the at least one MC client node 300 is located in, or proximate to, a geographical area for which the elevated priority of use of network resources was granted.

Item 13. The method according to item 2, further comprising:
obtaining S114 a notification from the second MC service server 200b of release of the elevated priority of use of the network resources;
notifying S116 the at least one third MC service server 200c of the release.

Item 14. The method according to item 2, further comprising:
notifying S110b the second MC service server 200b with a queue status response when determined to queue the priority request, the queue status response comprising queuing information of the priority request; or
notifying S110c the second MC service server 200b with a priority request rejection when determined to reject the priority request.

Item 15. The method according to item 2, wherein the first MC service server 200a, the second MC service server 200b, and the at least one third MC service server 200c are part of same trusted network domain.

Item 16. The method according to item 2, wherein the first MC service server 200a, the second MC service server 200b, and the at least one third MC service server 200c are part of a group communications system.

Item 17. The method according to item 2, wherein the network resources are used for at least one of transporting data of the service provided by the second MC service server 200b, prioritized admission control, and prioritized radio scheduling.

Item 18. The method according to item 2, wherein the service provided by the second MC service server 200b is an MC push-to-talk service, an MC video communications service, an MC audio communications service, an MC streaming service, MC data access services, MC machine type communication services, or an MC short message service.

Item 19. A method for priority notification of a Mission Critical, MC, service in a network 100, the method being performed by a second MC service server 200b, the method comprising:
obtaining S204 an indication of a need for elevated priority of use of network resources for a service provided by the second MC service server 200b;
providing S206 a priority request for the elevated priority to a first MC service server 200a; and obtaining S208 a notification of grant of the request from the first MC service server 200a.

Item 20. The method according to item 19, further comprising:
obtaining S202 a notification from the first MC service server 200a that the first MC service server 200a has been designated as a priority arbitrator for determining whether to grant, reject, or queue priority requests from the second MC service server 200b.

Item 21. The method according to item 19, further comprising:
providing S210 the service to at least one MC client node 300 using the elevated priority of the network resources.

Item 22. The method according to item 19, further comprising:
obtaining S212 an indication of ceased need for the elevated priority of use of the network resources; and
notifying S214 the first MC service server 200a of release of the elevated priority of use of the network resources.

Item 23. A method for priority notification of a Mission Critical, MC, service in a network 100, the method being performed by a third Mission Critical, MC, service server 200c, the method comprising:
obtaining S304, from a first MC service server 200a, a notification of grant of a priority request from a second MC service server 200b for elevated priority of use of network resources for a service provided by the second MC service server 200b.

Item 24. The method according to item 23, further comprising:
obtaining S302 a notification from the first MC service server 200a that the first MC service server 200a has been designated as a priority arbitrator for determining whether to grant, reject, or queue priority requests from the third MC service server 200c.

Item 25. The method according to item 23, further comprising:
obtaining S306 a notification from the first MC service server 200a of release of the elevated priority of use of the network resources.

Item 26. A method for priority notification of a Mission Critical, MC, service, the method being performed by an MC client node 300, the method comprising:
obtaining S402, from a first MC service server 200a, a notification of grant of a priority request from a second MC service server 200b for elevated priority of use of network resources for a service provided by the second MC service server 200b.

Item 27. The method according to any of the preceding items, wherein any messages communicated between the first MC service server 200a, the second MC service server 200b, and the at least one third MC service server 200c are communicated using a call control protocol, such as Session Initiation Protocol, SIP, Session Announcement Protocol, SAP, Hypertext Transfer Protocol, HTTP, or Realtime Transmission Control Protocol, RTCP.

Item 28. A network 100 for determining priority of use of network resources used by a Mission Critical, MC, service in a network 100, network 100 comprising a first MC service server 200a and a second MC service server 200b configured to:
obtain, by the second MC service server 200b, an indication of a need for elevated priority of use of network resources for a service provided by the second MC service server 200b;
obtain, by the first MC service server 200a, a priority request from the second MC service server 200b for elevated priority of use of network resources for the service provided by the second MC service server 200b;
determine, by the first MC service server 200a, whether to grant, reject, or queue the priority request; and when determined to grant the priority request: and obtain, by the second MC service server 200*b*, a first notification of the grant of the request from the first MC service server 200*a*.

Item 29. A Mission Critical, MC, service server 200*a* for determining priority of use of network resources used by an MC service in a network 100, the MC service server 200*a* comprising processing circuitry 210, the processing circuitry being configured to cause the MC service server 200*a* to:
  obtain a priority request from a second MC service server 200*b* for elevated priority of use of network resources for a service provided by the second MC service server 200*b*;
  determine whether to grant, reject, or queue the priority request; and when determined to grant the priority request:
  provide a first notification of the grant to the second MC service server 200*b* and a second notification of the grant to at least one third MC service server 200*c*.

Item 30. A Mission Critical, MC, service server 200*a* for determining priority of use of network resources used by an MC service in a network 100, the MC service server 200*a* comprising:
  processing circuitry 210; and
  a storage medium 230 storing instructions that, when executed by the processing circuitry 210, cause the MC service server 200*a* to:
    obtain a priority request from a second MC service server 200*b* for elevated priority of use of network resources for a service provided by the second MC service server 200*b*;
    determine whether to grant, reject, or queue the priority request; and when determined to grant the priority request:
    provide a first notification of the grant to the second MC service server 200*b* and a second notification of the grant to at least one third MC service server 200*c*.

Item 31. A Mission Critical, MC, service server 200*a* for determining priority of use of network resources used by an MC service in a network 100, the MC service server 200*a* comprising:
  an obtain module 210*c* configured to obtain a priority request from a second MC service server 200*b* for elevated priority of use of network resources for a service provided by the second MC service server 200*b*;
  a determine module 210*d* configured to determine whether to grant, reject, or queue the priority request; and
  a provide module 210*e* configured to, when determined to grant the priority request, provide a first notification of the grant to the second MC service server 200*b* and a second notification of the grant to at least one third MC service server 200*c*.

Item 32. A Mission Critical, MC, service server 200*b* for priority notification of an MC service in a network 100, the MC service server 200*b* comprising processing circuitry 210, the processing circuitry being configured to cause the MC service server 200*b* to:
  obtain an indication of a need for elevated priority of use of network resources for a service provided by the MC service server 200*b*;
  provide a priority request for the elevated priority to a first MC service server 200*a*; and
  obtain a notification of grant of the request from the first MC service server 200*a*.

Item 33. A Mission Critical, MC, service server 200*b* for priority notification of an MC service in a network 100, the MC service server 200*b* comprising:
  processing circuitry 210; and
  a storage medium 230 storing instructions that, when executed by the processing circuitry 210, cause the MC service server 200*b* to:
    obtain an indication of a need for elevated priority of use of network resources for a service provided by the MC service server 200*b*;
    provide a priority request for the elevated priority to a first MC service server 200*a*; and
    obtain a notification of grant of the request from the first MC service server 200*a*.

Item 34. A Mission Critical, MC, service server 200*b* for priority notification of an MC service in a network 100, the MC service server 200*b* comprising:
  an obtain module 210*l* configured to obtain an indication of a need for elevated priority of use of network resources for a service provided by the MC service server 200*b*;
  a provide module 210*m* configured to provide a priority request for the elevated priority to a first MC service server 200*a*; and
  an obtain module 210*n* configured to obtain a notification of grant of the request from the first MC service server 200*a*.

Item 35. A Mission Critical, MC, service server 200*c* for priority notification of an MC service in a network 100, the MC service server 200*c* comprising processing circuitry 210, the processing circuitry being configured to cause the MC service server 200*c* to:
  obtain, from a first MC service server 200*a*, a notification of grant of a priority request from a second MC service server 200*b* for elevated priority of use of network resources for a service provided by the second MC service server 200*b*.

Item 36. A Mission Critical, MC, service server 200*c* for priority notification of an MC service in a network 100, the MC service server 200*c* comprising:
  processing circuitry 210; and
  a storage medium 230 storing instructions that, when executed by the processing circuitry 210, cause the MC service server 200*c* to:
    obtain, from a first MC service server 200*a*, a notification of grant of a priority request from a second MC service server 200*b* for elevated priority of use of network resources for a service provided by the second MC service server 200*b*.

Item 37. A Mission Critical, MC, service server 200*c* for priority notification of an MC service in a network 100, the MC service server 200*c* comprising:
  an obtain module 210*s* configured to obtain, from a first MC service server 200*a*, a notification of grant of a priority request from a second MC service server 200*b* for elevated priority of use of network resources for a service provided by the second MC service server 200*b*.

Item 38. A Mission Critical, MC, client node 300 for priority notification of an MC service in a network 100, the MC client node 300 comprising processing circuitry 310, the processing circuitry being configured to cause the MC client node 300 to:
  obtain, from a first MC service server 200*a*, a notification of grant of a priority request from a second MC service server 200b for elevated priority of use of network resources for a service provided by the second MC service server 200b.

Item 39. A Mission Critical, MC, client node 300 for priority notification of an MC service in a network 100, the MC client node 300 comprising:
  processing circuitry 310; and
  a storage medium 330 storing instructions that, when executed by the processing circuitry 310, cause the MC client node 300 to:
    obtain, from a first MC service server 200a, a notification of grant of a priority request from a second MC service server 200b for elevated priority of use of network resources for a service provided by the second MC service server 200b.

Item 40. A Mission Critical, MC, client node 300 for priority notification of an MC service in a network 100, the MC client node 300 comprising:
  an obtain module 310a configured to obtain, from a first MC service server 200a, a notification of grant of a priority request from a second MC service server 200b for elevated priority of use of network resources for a service provided by the second MC service server 200b.

Item 41. A computer program 1120a for determining priority of use of network resources used by a Mission Critical, MC, service in a network 100, the computer program comprising computer code which, when run on processing circuitry 210 of an MC service server 200a, causes the MC service server 200a to:
  obtain S106 a priority request from a second MC service server 200b for elevated priority of use of network resources for a service provided by the second MC service server 200b;
  determine S108 whether to grant, reject, or queue the priority request; and when determined to grant the priority request:
  provide S110a a first notification of the grant to the second MC service server 200b and a second notification of the grant to at least one third MC service server 200c.

Item 42. A computer program 1120b for priority notification of a Mission Critical, MC, service in a network 100, the computer program comprising computer code which, when run on processing circuitry 210 of an MC service server 200b, causes the MC service server 200b to:
  obtain S204 an indication of a need for elevated priority of use of network resources for a service provided by the MC service server 200b;
  provide S206 a priority request for the elevated priority to a first MC service server 200a; and
  obtain S208 a notification of grant of the request from the first MC service server 200a.

Item 43. A computer program 1120c for priority notification of a Mission Critical, MC, service in a network 100, the computer program comprising computer code which, when run on processing circuitry 210 of an MC service server 200c, causes the MC service server 200c to:
  obtain S304, from a first MC service server 200a, a notification of grant of a priority request from a second MC service server 200b for elevated priority of use of network resources for a service provided by the second MC service server 200b.

Item 44. A computer program 1120d for priority notification of a Mission Critical, MC, service in a network 100, the computer program comprising computer code which, when run on processing circuitry 310 of an MC client node 300, causes the MC client node 300 to:
  obtain S402, from a first MC service server 200a, a notification of grant of a priority request from a second MC service server 200b for elevated priority of use of network resources for a service provided by the second MC service server 200b.

Item 45. A computer program product 1110a, 111b, 1110c, 1110d comprising a computer program 1120a, 1120b, 1120c, 1120d according to at least one of items 41, 42, 43, and 44, and a computer readable storage medium 1130 on which the computer program is stored.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining priority of use of network resources used by a Mission Critical (MC) service in a network, the method comprising:
  a first MC service server being assigned a priority arbitration role and configured to provide centralized priority arbitration whereby the first MC service server arbitrates priority of use of network resources for MC services relative to other MC services that use, or may potentially use, the same network resources:
    obtaining a priority request from a second MC service server for elevated priority of use of network resources for an MC service provided by the second MC service server, wherein the elevated priority is above a priority that the second MC service server can utilize without the centralized priority arbitration provided by the first MC service server, and wherein the elevated priority of use of network resources corresponds to the priority of the MC service over the other MC services that use, or may potentially use, the network resources;
    based on at least one piece of property information provided in the priority request, determining whether to grant, reject, or queue the priority request; and
    in response to determining to grant the priority request:
      providing a first notification of the grant to the second MC service server; and
      providing a second notification of the grant to at least one third MC service server.

2. The method of claim 1, further comprising:
  obtaining a notification designating the first MC service server as a priority arbitrator for determining whether to grant, reject, or queue priority requests from the second MC service server and the at least one third MC service server; and
  notifying the second MC service server and the at least one third MC service server that the first MC service server is designated as the priority arbitrator.

3. The method of claim 1, wherein the at least one piece of property information comprises at least one property from a group comprising identification of geographical area in which the network resources are to be used, a requested priority level, time constraints, service type of the MC service provided by the second MC service, and needed bandwidth of the network resources.

4. The method of claim 1, wherein the determining whether to grant, reject, or queue the priority request is further based on MC service type, MC incident type, MC organization information, first responder dispatcher decision, and/or current network status and availability.

5. The method of claim 1, wherein the determining whether to grant, reject, or queue the priority request is further based on request information provided in the priority request, status information indicating operation of at least one of the second MC service server, and/or the at least one third MC service server.

6. The method of claim 1, wherein the first notification further comprises a time limit for how long a time period the elevated priority has been granted for the second MC service server.

7. The method of claim 1, further comprising notifying at least one MC client node of the grant.

8. The method of claim 7, wherein the at least one MC client node only is notified when the at least one MC client node is located in, or proximate to, a geographical area for which the elevated priority of use of network resources was granted.

9. The method of claim 1, further comprising:
obtaining a notification from the second MC service server of release of the elevated priority of use of the network resources; and
notifying the at least one third MC service server of the release.

10. The method of claim 1, further comprising:
notifying the second MC service server with a queue status response when determined to queue the priority request, the queue status response comprising queuing information of the priority request; or
notifying the second MC service server with a priority request rejection when determined to reject the priority request.

11. The method of claim 1, wherein the first MC service server, the second MC service server, and the at least one third MC service server are part of same trusted network domain.

12. The method of claim 1, wherein the first MC service server, the second MC service server, and the at least one third MC service server are part of a group communications system.

13. The method of claim 1, wherein the network resources are used for transporting data of the service provided by the second MC service server, prioritized admission control, and/or prioritized radio scheduling.

14. A method for priority notification of a Mission Critical (MC) service in a network comprising a first MC service server being assigned a priority arbitration role and configured to provide centralized priority arbitration whereby the first MC service server arbitrates priority of use of network resources for MC services relative to other MC services that use, or may potentially use, the same network resources, the method comprising a second MC service server:
obtaining an indication of a need for elevated priority of use of network resources for an MC service provided by the second MC service server, wherein the elevated priority is above a priority that the second MC service server can utilize without the centralized priority arbitration provided by the first MC service server, and wherein the elevated priority of use of network resources corresponds to a priority of the MC service over the other MC services that use, or may use, the network resource;
providing a priority request for the elevated priority to the first MC service server that is assigned the priority arbitrator role; and
obtaining a notification of grant of the request from the first MC service server.

15. The method of claim 14, further comprising obtaining a notification from the first MC service server that the first MC service server has been designated as a priority arbitrator for determining whether to grant, reject, or queue priority requests from the second MC service server.

16. The method of claim 14, further comprising providing the service to at least one MC client node using the elevated priority of the network resources.

17. The method of claim 14, further comprising:
obtaining an indication of ceased need for the elevated priority of use of the network resources; and
notifying the first MC service server of release of the elevated priority of use of the network resources.

18. A Mission Critical (MC) service server for determining priority of use of network resources used by an MC service in a network, the MC service server being assigned a priority arbitration role and configured to provide centralized priority arbitration whereby the MC service server arbitrates priority of use of network resources for MC services relative to other MC services that use, or may potentially use, the same network resources, the MC service server comprising:
processing circuitry; and
memory containing instructions executable by the processing circuitry whereby the MC service server is operative to:
obtain a priority request from a second MC service server for elevated priority of use of network resources for an MC service provided by the second MC service server, wherein the elevated priority is above a priority that the second MC service server can utilize without the centralized priority arbitration provided by the first MC service server, and wherein the elevated priority of use of network resources corresponds to the priority of the MC service over the other MC services that use, or may potentially use, the network resources;
based on at least one piece of property information provided in the priority request, determine whether to grant, reject, or queue the priority request;
in response to determining to grant the priority request:
provide a first notification of the grant to the second MC service server; and
provide a second notification of the grant to at least one third MC service server.

19. A Mission Critical (MC) service server for priority notification of an MC service in a network comprising a first MC service server being assigned a priority arbitration role and configured to provide centralized priority arbitration whereby the first MC service server arbitrates priority of use of network resources for MC services relative to other MC services that use, or may potentially use, the same network resources, the MC service server comprising:
processing circuitry; and
memory containing instructions executable by the processing circuitry whereby the MC service server is operative to:
obtain an indication of a need for elevated priority of use of network resources for an MC service provided by the MC service server, wherein the elevated priority is above a priority that the MC service server can utilize without the centralized priority arbitration provided by the first MC service server, and wherein the elevated priority of use of network resources corresponds to a priority of the MC service over the other MC services that use, or may use, the network resource;

provide a priority request for the elevated priority to the first MC service server that is assigned the priority arbitrator role; and obtain a notification of grant of the request from the first MC service server.

* * * * *

UNITED STATES PATENT AND TRADEMARK OFFICE
CERTIFICATE OF CORRECTION

| | |
|---|---|
| PATENT NO. | : 11,477,798 B2 |
| APPLICATION NO. | : 16/608891 |
| DATED | : October 18, 2022 |
| INVENTOR(S) | : Tränk et al. |

Page 1 of 1

It is certified that error appears in the above-identified patent and that said Letters Patent is hereby corrected as shown below:

In the Specification

In Column 1, Line 35, delete "PIT" and insert -- PTT --, therefor.

In Column 1, Line 37, delete "PIT" and insert -- PTT --, therefor.

In Column 1, Lines 40-41, delete "Multicast-Broadcast Multimedia Services (MBMS)" and insert -- Multimedia Broadcast Multicast Services (MBMS) --, therefor.

In Column 12, Line 5, delete "200" and insert -- 200c --, therefor.

In Column 24, Line 6, delete "111b," and insert -- 1110b, --, therefor.

Signed and Sealed this
Fourth Day of April, 2023

Katherine Kelly Vidal
*Director of the United States Patent and Trademark Office*